J. McKOWN.
Seed-Planter.
No. 20,651.
Patented June 22. 1858
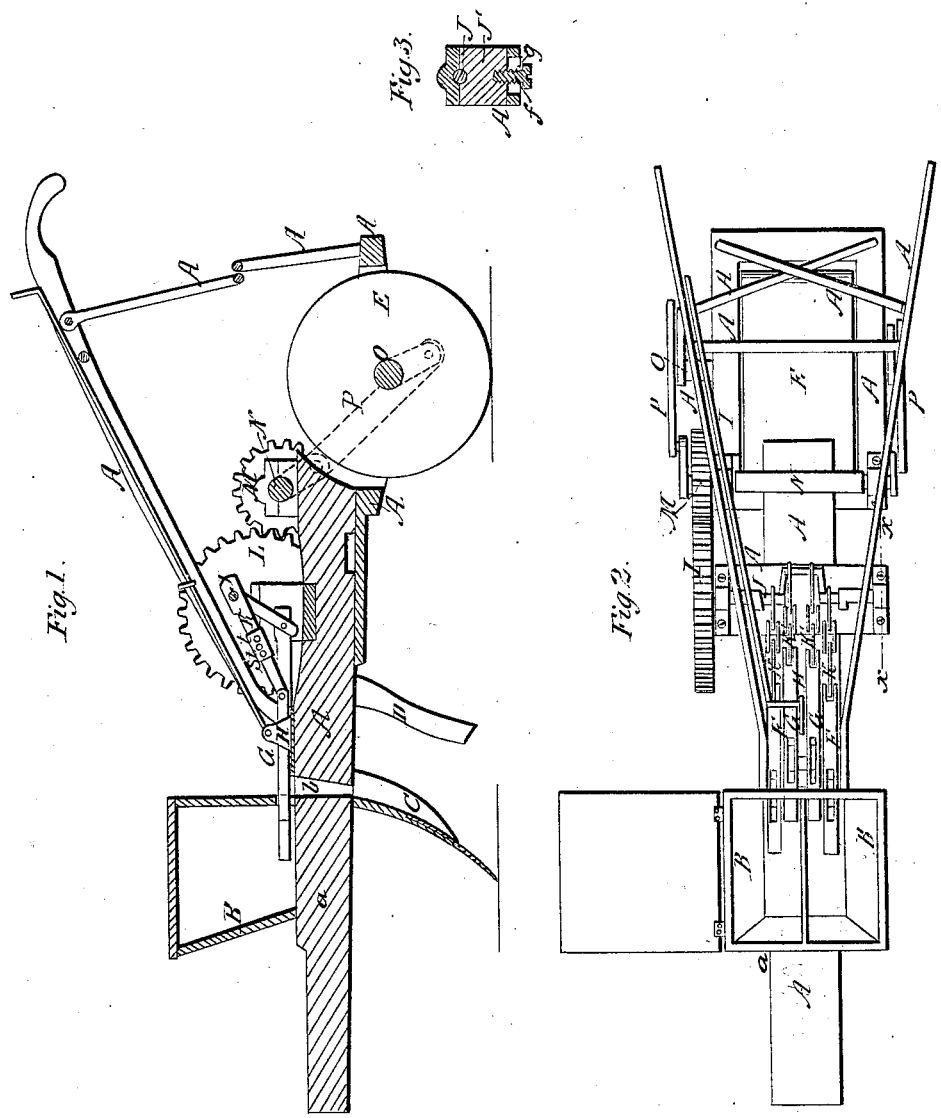

UNITED STATES PATENT OFFICE.

J. McKOWN, OF GERRARDSTOWN, VIRGINIA.

IMPROVEMENT IN SEED-PLANTERS.

Specification forming part of Letters Patent No. 20,651, dated June 22, 1858.

*To all whom it may concern:*

Be it known that I, JOSEPH McKOWN, of Gerrardstown, in the county of Berkeley and State of Virginia, have invented a new and useful Improvement in Seed-Planters; and I do hereby declare that the following is a full, clear, and exact description of the same, reference being had to the accompanying drawings, forming a part of this specification, in which—

Figure 1 is a vertical longitudinal section of the machine constructed after my invention. Fig. 2 is a plan of the same.

Similar letters of reference in each of the several figures indicate corresponding parts.

The nature of my invention consists in the arrangement and combination of two or more sets of alternately-operating seed-slides, a cut-off device, a crank-shaft for operating the machine, two cog-wheels, and two crank-shafts for transmitting motion from the propelling and covering-in rollers to the first crank which actuates the slides, as and for the purposes presently set forth.

To enable others skilled in the art to make and use my invention, I will proceed to describe its construction and operation.

A represents the frame of the machine.

B is the hopper, mounted upon the forward part of the beam *a*. This hopper is divided into two chambers, so as to plant seed and manure at the same time through one flaring tube or passage, *b*, in the beam.

C represents a furrow-opener, and D D covering-shares.

E is a rolling-in roller.

F F G G represent two sets of slides arranged under the hopper, and so as to move alternately backward and forward, the set G G going in under the hopper and receiving seed and guano from the same, while the set F F are bringing out seed and guano to a position behind the hopper and depositing it into the passage *b*, and the set F F returning while G G are coming out with a like supply for deposit into the tube. By this arrangement the farmer can see if the distribution of the seed is being accomplished at each operation, and no time is lost in waiting for the slide to make a return movement in order to receive seed, as one set is always receiving while the other is dropping seed.

H is a cut-off plate, arranged under the seed-distributing slides and over the passage *b* in the beam. This plate is designed for opening and closing the hole *b*, and thus controlling the escape of the seed from the cells of the slides.

I is a rod leading from the cut-off plate to the rear end of the handle of the plow, so as to afford facilities to the plowman for operating the cut-off plate.

J is a three-throw crank-shaft, combined with the slides by means of connecting-rods K K K' K', said rods being divided and coupled together by links *s* and adjustable pins *t t*, so as to be increased or diminished in length, as may be necessary.

L is a large spur-wheel on the end of the crank-shaft J. It gears into a small pinion, M, on the end of a crank-shaft, N.

O is a crank-shaft passed through the rolling-in roller E, and combined with the crank-shaft N by means of connecting-rods P P.

The standards and boxes which support the crank-shaft J are adjustable backward by means of slots and set-screws *f g*. By thus having the boxes adjustable and the connecting-rods of the slides capable of extension a smaller spur-wheel can be substituted for L, and thus the speed increased.

What I claim as my invention, and desire to secure by Letters Patent, is—

The arrangement of two or more alternately-operating slides, F G, cut-off device H I, crank-shafts J N O, intermediate gearing, L M, adjustable standards J', and extension connecting-rods K K K' K', substantially in the manner and for the purpose herein described.

The above specification of my seed-planter signed by me this 15th day of April, 1857.

JOSEPH McKOWN.

Witnesses:
G. YORKE ATLEE,
EDM. F. BROWN.